Oct. 23, 1934.  J. R. WHITTLES  1,978,181
HYDRAULICALLY DRIVEN SURFACE GRINDING MACHINE
Filed Dec. 30, 1930  5 Sheets-Sheet 1

Inventor
JOSEPH R. WHITTLES

Oct. 23, 1934.   J. R. WHITTLES   1,978,181

HYDRAULICALLY DRIVEN SURFACE GRINDING MACHINE

Filed Dec. 30, 1930   5 Sheets-Sheet 3

WITNESSES
Franklin E. Johnson
Harold W. Eaton

Inventor
JOSEPH R. WHITTLES
By Clayton R. Jenks
Attorney

Oct. 23, 1934.  J. R. WHITTLES  1,978,181
HYDRAULICALLY DRIVEN SURFACE GRINDING MACHINE
Filed Dec. 30, 1930   5 Sheets-Sheet 5

WITNESSES
Franklin E. Johnson
Harold W. Eaton

Inventor
JOSEPH R. WHITTLES
By Clayton L. Jenks
Attorney

Patented Oct. 23, 1934

1,978,181

UNITED STATES PATENT OFFICE 1,978,181

HYDRAULICALLY DRIVEN SURFACE GRINDING MACHINE

Joseph R. Whittles, Rockford, Ill., assignor to Norton Company, Worcester, Mass., a corporation of Massachusetts Application December 30, 1930, Serial No. 505,662

10 Claims. (Cl. 51—92)

This invention relates to grinding machines and more particularly to a hydraulically operated surface grinding machine.

The modern surface grinding machines for grinding plane surfaces, are usually provided with a reciprocating mechanism for the work table to cause a relative reciprocation between the work piece and the grinding wheel. To meet the high production which industry demands, it is necessary to provide a rapid reciprocation of the work table to increase the efficiency of the machine. It is essential that the table reciprocating mechanism be so constructed and arranged that the table may be reciprocated rapidly and that its reversal in direction of movement may be obtained without undue shocks and vibrations. Numerous hydraulically actuated mechanisms have been devised for such purposes. These mechanisms are provided in many cases with a complicated system of valves and pipes to obtain the desired table movement.

These machines are usually provided with manually controllable feeding and traversing mechanisms for the grinding wheel. It is highly desirable in certain types of surface grinding machines to have an automatic feed to intermittently traverse the grinding wheel into contact with a new portion of the work piece at intervals during the grinding operation and to automatically reverse the direction of the traversing movement when the wheel has traversed through a predetermined distance.

It is one object of this invention to provide a surface grinding machine with an automatic transverse feed for advancing the grinding wheel intermittently across the face of the work as the table is reciprocated, and to reverse the direction of the feed automatically when the wheel has reached a predetermined position.

It is a further object of this invention to provide a fluid pressure operated system for moving both the wheel slide and the table which is so constructed and arranged that the cross feed mechanism is actuated in a timed relation with the reversal of the table reciprocation.

It is another object of this invention to provide a surface grinding machine with a simplified hydraulic table reciprocating mechanism whereby a rapid movement of the table may be obtained with an easy reversal at the ends of the table stroke.

Other objects will be apparent from the following disclosure. One embodiment of this invention has been illustrated in the accompanying drawings, in which like reference numerals indicate like parts.

A surface grinding machine of the open sided type has been illustrated in the drawings. This machine comprises a base 15 having a work table 16 slidably mounted on a V-way 17 and flat way 18. A grinding wheel 19 is rotatably mounted on a wheel slide 20 which is arranged to be fed transversely in the guide way 21 carried by a vertical slide 22 so that the grinding wheel may be fed transversely of the work table to grind surfaces of greater width than the thickness of the grinding wheel. The slide 22 is slidably mounted on a vertical projection 23 of the base 15 so that the grinding wheel may be adjusted vertically to permit grinding the work surface to the required extent.

Table operating mechanism

A table reciprocating mechanism is provided to reciprocate the work table 16 relative to the grinding wheel at a rapid rate. As illustrated in the drawings, this may comprise a cylinder 25 and piston 26 forming a fluid pressure actuated motor. The cylinder 25 is preferably fixed to the base by means of a bracket 27 and screws 28. The piston 26 is connected by a rod 29 to a depending bracket 30 on the table 16. It will be readily appreciated from this construction that as fluid is admitted to the end of the cylinder a corresponding movement will be transmitted to reciprocate the work table. Fluid may be supplied by any suitable fluid pressure system, but in the preferred construction fluid is drawn from a reservoir 31 in the base 15, through a strainer 32 and a pipe 33 by a pump 34. The pump 34 forces fluid under pressure through the pipe 35 and a reversing valve 36 either to the cylinder chamber 37 or to chamber 38 depending upon which direction it is desired to move the table.

Reversing valve

In the preferred construction, a reversing valve of the rotary type is provided in which the rotary member is held seated by fluid under pressure and is rotatably mounted in anti-friction bearings so that it may be reversed with a minimum amount of effort either manually or automatically as desired. This valve preferably comprises a rotary member 39 which is frusto-conical in shape and adapted to fit within a correspondingly shaped aperture 40 in the valve casing 41. To minimize the wear between the rotary member 39 and the casing 41 and also to provide an easily rotated valve member, anti-friction bearings 42 and 43 are interposed between the ends of the valve and the valve casing 41. The valve is provided with a central aperture 44 through which fluid enters from the pipe 35. It will be readily appreciated that the pressure of the fluid entering at the base of the conical member tends to seat the valve and maintain it in proper relation with the valve casing 41.

To permit adjustment of and to minimize the friction between the valve 39 and casing 41, a ball end thrust bearing 45 is provided between the valve stem 46 and the frame of the machine. An adjusting screw 47 is mounted in a plate 48 on the base 15 and arranged to contact with the ball 45. By adjusting the screw 47, the position of the ball 45 may be varied so that the rotary valve 39 may be maintained in proper relation with its casing 41.

The central aperture 44 of the valve member 39 has an upwardly projecting portion 49 which extends to the peripheral surface of the valve. At the intersection of the hole 49 and the frusto-conical surface of member 39, is an enlarged opening forming V-shaped ports 50 and 51 having their apexes extending in opposite directions. The port 49 is arranged so that it may be turned to pass fluid under pressure through a port 52, a pipe 53 into the cylinder chamber 37 to move the piston 26 and table 16 toward the right, as viewed in Figs. 1, 3 and 7, or to pass through a port 54 into the cylinder chamber 38 to move the piston 26 and table 16 toward the left as viewed in Figs. 1, 3 and 8. The oppositely extending V ports 50 and 51 are provided so that when the reversing valve 39 is turned to change the direction of travel of the table, the fluid flow is gradually reduced and cut off from one side of the system, as it is admitted and gradually increased on the other side, thereby producing an easy reversal of the table. The V ports 50 and 51 are so arranged that when the valve 39 is in a neutral or central position (Fig. 6) they communicate with the ports 52 and 54 respectively, so that the pressure on each side of the piston is equalized and the work table is held in a fixed position.

An exhaust groove 56 is provided in the periphery of the valve member 39 extending from a point adjacent to the apex of V 50 to a point adjacent to the apex of V 51. The V portions 50 and 51 and the exhaust groove 56 are so arranged relative to the each other, that when the valve 39 is moved in a clockwise direction beyond the neutral position (Fig. 6) during reversal, fluid passing through the passage 54 is gradually increased and is gradually decreased through passage 52 until the valve reaches the position indicated in Fig. 12. When valve 39 reaches this position, fluid under pressure passing through V 50 into passage 52 will by-pass into exhaust groove 56 and through exhaust port 57, pipe 58 and return to reservoir 31. The fluid under pressure within chamber 37 is also free to exhaust through groove 56 and port 57 and the fluid under pressure passing through V 51 and passage 54 into chamber 38, starts the table gradually in the reverse direction. The movement of the table accelerates until the valve 39 reaches the position illustrated in Fig. 8 with the port 49 aligned with passage 54 and passage 52 aligned with exhaust groove 56 so that the table traverses at its normal speed.

Figures 3, 9:
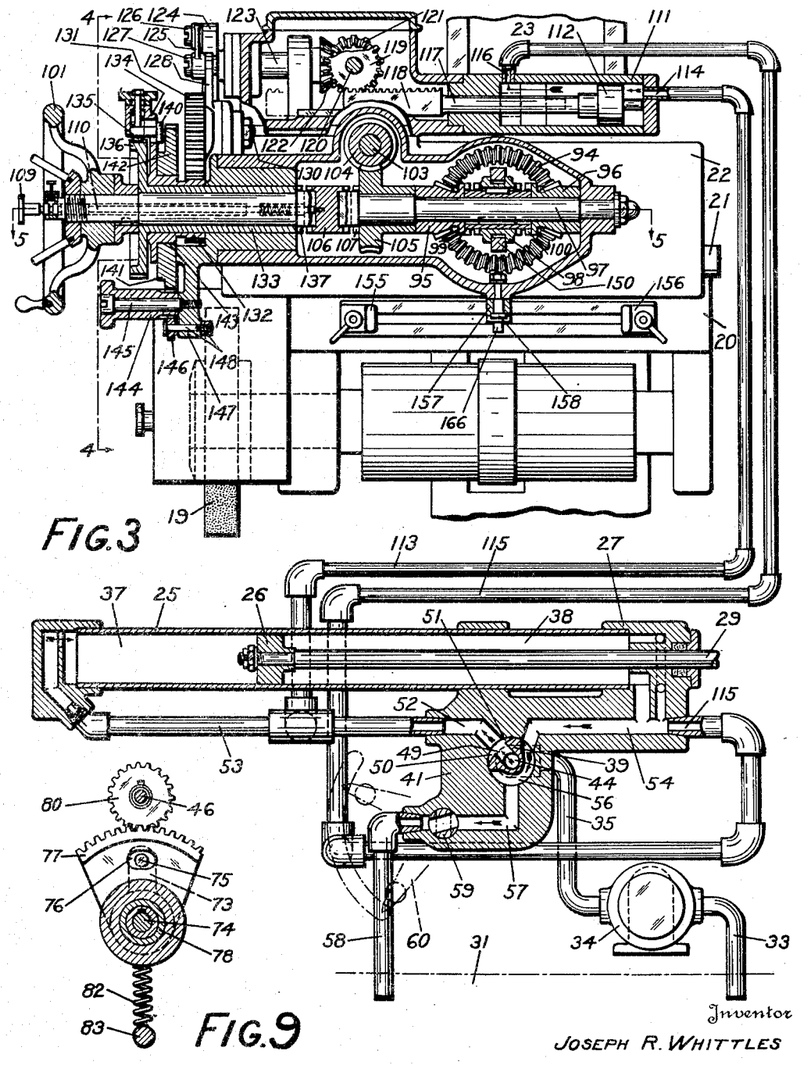
Fig. 3 is a fragmentary diagrammatic view showing the connections between the hydraulic table reversing mechanism and the fluid actuated cross feed mechanism.
Fig. 9 is a fragmentary sectional view taken approximately on line 9—9 of Fig. 2, showing parts of the reverse valve operating mechanism.
Figure 7:
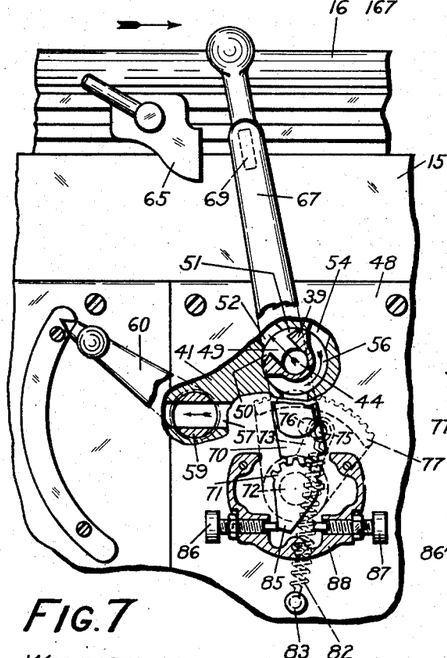
Fig. 7 is a similar fragmentary view, on an enlarged scale, showing the reversing valve and speed control valve with the reversing lever in a position so that the table is traveling in a direction toward the right.
Figure 8:
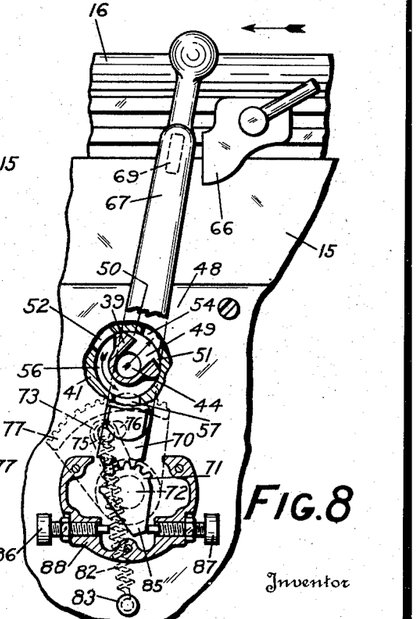
Fig. 8 is a similar fragmentary view of the reversing valve and operating parts showing the valve and lever in a position so that the table is moving toward the left as viewed therein.

Similarly when valve 39 is moved from the position as shown in Fig. 8 into the position indicated in Figs. 3 and 7, fluid under pressure will be gradually cut off from passage 54 and gradually admitted and increased through passage 52 so as to reverse the direction of travel of the table without undue shocks and vibrations.

Speed control

In order that the speed of the work table may be varied to give the desired grinding action, I provide a throttle valve 59 which is preferably located in the exhaust side of the system between the port 57 and the pipe 58, so that there is a constant pressure on the intake side of the system and the speed of travel of the table is definitely controlled by throttling the exhaust of fluid passing through the port 57. The valve 59 is controlled by a lever 60 which is mounted on the front of the machine base so that the operator may readily adjust the speed of movement of the work table 16.

Reverse valve actuating mechanism

The reversing valve 39 may be controlled by a suitable mechanism which is arranged so that it may be actuated either manually or automatically by adjustable dogs 65 and 66 on the table 16. A reverse lever 67 is pivotally mounted on a stud 68 which is fixed to the plate 48 on the base 15. The lever 67 is provided with an inwardly projecting lug 69, which is arranged in the path of adjustable dogs 65 and 66 so that when the table is reciprocated, the dogs engage the lug 69 and rock the lever 67 on its pivot stud 68. The lower end of the lever 67 is provided with a gear segment 70 meshing with a gear segment 71 on the outer end of a rock shaft 72. The rock shaft 72 is connected at its inner end by a suitable mechanism to actuate the valve 39 and change the direction of movement of the fluid through the system.

In the preferred construction, a lost motion device is provided in the connections between the rock shaft 72 and the valve stem 46 so that the reverse lever 67 may be rocked to a neutral position before the valve is moved to cut off and reverse the flow of fluid. This mechanism comprises the arm 73 which is keyed to the projection 74 of the rock shaft 72. The upper end of the arm 73 carries a pin 75 which rides in an elongated slot 76 in a gear segment 77. The gear segment 77 is freely rotatable on a hub 78 of a bushing 79. The gear segment 77 meshes with a pinion 80 which is keyed to the stem 46 of the valve 39.

Figures 2, 6, 11:
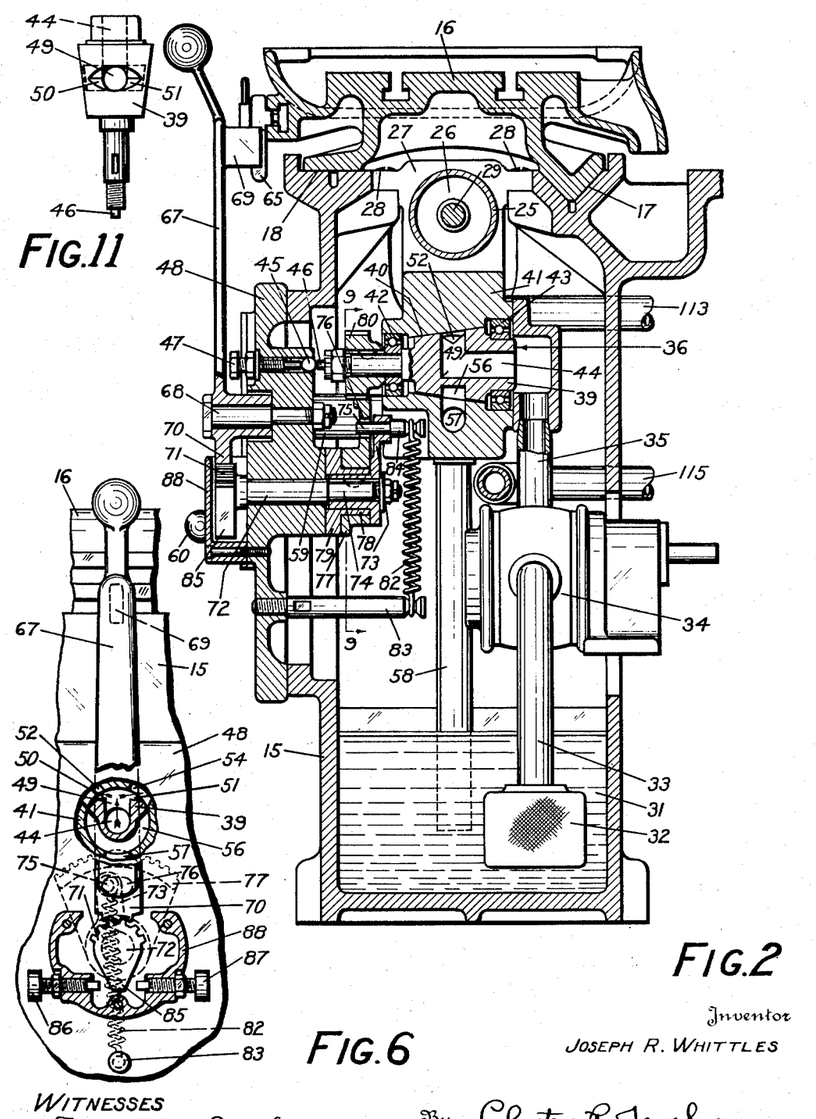
Fig. 2 is a cross sectional view on an enlarged scale taken approximately on the line 2—2 of Fig. 1.
Fig. 6 is a fragmentary view, on an enlarged scale, showing the reversing valve and its operating mechanism having parts broken away and others shown in section to clarify the construction.
Fig. 11 is a detail view of the rotary part of the reversing valve.

It will be readily appreciated from this disclosure that movement of the lever 67 in either direction moves the pin 75 until it engages the end of the elongated slot 76 before transmitting any rotary movement to the valve 39. Movement of the lever 67 in the direction of the arrow (Fig. 7), either manually or by the adjustable table dog 65, rotates the valve 39 in the same direction that the lever is moved. Table movement continues until the V port 51 uncovers part of the port 54 to admit fluid under pressure through this port to the cylinder chamber 38. In the center position, as illustrated in Fig. 6, fluid under pressure passing through the valve ports 44 and 49 passes through the valve, V ports 50 and 51, ports 52 and 54 in the valve casing to each side of the piston 26 so that the pressure on each side of the piston is balanced. It is desirable when the valve reaches this point that a suitable mechanism be provided to throw the valve quickly into a reverse position to change the direction of movement of the table.

In the preferred construction, this may comprise a spring 82 which is connected at one end to a pin 83 fixed to the plate 48 on the base 15 and at the other end to an extension 84 of the pin 75. This spring 82 is at all times under sufficient tension so that when the pin 75 passes its high or center point in its travel, the tension of the spring 82 will quickly rock the arm 73 and through the gear segment 77 and pinion 80 will rock the valve 39 quickly into a reverse position, such as shown in Fig. 8.

It is desirable that the movement of the lever 67 be limited so as to restrict the rotary movement of the valve 39. This is preferably accomplished by providing a projecting portion 85 depending from the rock shaft 72. A pair of adjustable stop screws 86 and 87 are threaded into a casing 88 on the plate 48 and arranged in the path of the projection 85. By adjusting the screws 86 and 87, the amount of rocking movement of the lever 67 in either direction may be controlled.

Wheel feeding mechanism

In a surface grinding machine of this type, it is desirable that the grinding wheel be fed downwardly in a vertical direction toward and from the work table to permit grinding the surface of the work to the desired dimensions, and it is also necessary that a transverse feeding movement be provided to permit a transverse feeding of the grinding wheel in grinding work which is wider than the width of the grinding wheel. As illustrated in the drawings, the vertical slide 22 carrying the grinding wheel slide may be moved vertically, either toward or from the work, by means of a hand wheel 90 which is operatively connected to either rotate a feed screw engaging a nut within the slide 22 or to turn a nut engaging a screw which is fixed to the slide 22. This feature is not considered part of the present invention and consequently details of construction have not been illustrated. For further details of this vertical feeding movement, reference may be had to the prior U. S. Patent to C. H. Norton No. 1,108,779.

The transverse slide 20 carrying the rotatable grinding wheel 19 is movable transversely on the vertical slide 22 to permit a transverse feeding movement of the grinding wheel when grinding work wider than the width of the grinding wheel. This slide may be fed manually by a suitable mechanism, such as is shown in the prior patented construction above mentioned. This mechanism may comprise a rack bar 91 mounted on the slide 20 and arranged to mesh with a pinion 92 mounted on a shaft 93 which is journaled in the slide 22. It will be readily apparent from this disclosure that rotation of the pinion 92 will transmit a transverse feeding movement to the grinding wheel relative to the work table.

It is desirable that the wheel may be fed rapidly to quickly adjust the wheel across the face of the work or slowly to give a fine feeding movement as desired. A bevel gear 94 is mounted on the end of the shaft 93. The gear 94 meshes with a pair of beveled pinions 95 and 96 which are rotatably mounted on a shaft 97. A clutch member 98 is interposed between the two gears and is arranged to be engaged either with the clutch teeth 99 on the gear 95 or the clutch teeth 100 on the gear 96 so that either gear may be locked to the shaft 97. To obtain a rapid manual transverse adjustment of the grinding wheel, a hand wheel 101 is provided on the outer end of the shaft 97. In surface grinding of certain types of work, it is desirable at times to provide a fine transverse feeding adjustment of the wheel. This is preferably accomplished by means of a hand wheel 102 which is mounted on the end of a shaft 103. The shaft 103 carries a worm 104 meshing with a worm gear 105 on the shaft 97. By turning the hand wheel 102, a fine transverse feed is obtained through the reduction gearing above described. In the operation of the machine, it is desirable that the fine feeding adjustment may be disconnected when not in use. This is preferably accomplished by means of a clutch member 106 arranged to engage clutch teeth 107 on the gear 105 so that the gear 105 may be locked to or rotated freely on the shaft 97. The clutch member 106 is preferably a flat member which slides in a slot 108 extending through the shaft 97. The clutch member is actuated by a knob 109 and a rod 110 connected at one end to the knob 109 and extending through a central aperture in shaft 97 and connected at its other end to clutch member 106.

Automatic transverse feed mechanism

It is one feature of this invention to provide an automatic transverse feeding movement for the grinding wheel, so that the wheel may be fed intermittently at one or both ends of the table stroke across the face of the surface being ground, and then reversed and traversed intermittently in the other direction. The preferred construction for obtaining this automatic action comprises a mechanism which operates in timed relationship with the table reciprocating mechanism, so that the grinding wheel is fed at the end of the table stroke. To accomplish this, a fluid pressure cylinder 111 and piston 112 are arranged to actuate the transverse feeding movement of the grinding wheel independently of the manually operated mechanism. In order to provide a simple and efficient construction for this purpose, I propose to mount the motor of the wheel feeding mechanism on the vertical slide. Also, in order that the piston 112 may operate at the end of the table stroke in timed relation with the table reciprocating mechanism, connections are made between the two fluid actuating systems. As illustrated diagrammatically in Fig. 3 of the drawings, a pipe 113 is connected to the pipe 53 at one end and to port 114 of cylinder 111 at the other end. A pipe 115 is connected to port 54, so that fluid passing through the port 54 enters both the cylinder chamber 38 and also the pipe 115, to pass fluid under pressure through the pipe 115 and port 116 into the left-hand end of cylinder 111.

The piston 112 is connected to one end of a piston rod 117. The other end of the rod 117 is connected to a rack bar 118 which meshes with a gear 119 on a shaft 120. The shaft 120 carries at its other end a bevel gear 121 which meshes with a bevel gear 122 on the shaft 123. The outer end of the shaft 123 carries a rotary plate 124. It will be readily appreciated that when the piston 112 is moved in either direction, this motion is transmitted through the rack 118 and gearing to rotate the plate 124 through a partial turn. Movement of the plate 124 is transmitted by a connecting rod 125 which is connected by a screw 126 to the plate 124. The other end of the rod 125 is connected by a screw 127 to the arm 128 of a bell crank 129 which is pivoted on the stud 130. The other arm of the bell crank 129 is provided with a gear segment 131 meshing with a gear 132 which is rotatably mounted on a sleeve 133.

The gear 132 is preferably connected to turn the shaft 97 intermittently at the end of the table stroke through a pawl and ratchet mechanism which permits varying the amount of transverse feeding movement at each end of the table stroke. An arm 134 is formed integrally with the gear 132. This arm carries a pawl 135 arranged to engage the teeth of a ratchet wheel 136. The ratchet wheel 136 is preferably integral with the sleeve 133 and is arranged to be locked to the shaft 97 by means of the clutch 106 being brought into engagement with the clutch teeth 137.

Figures 4, 10:
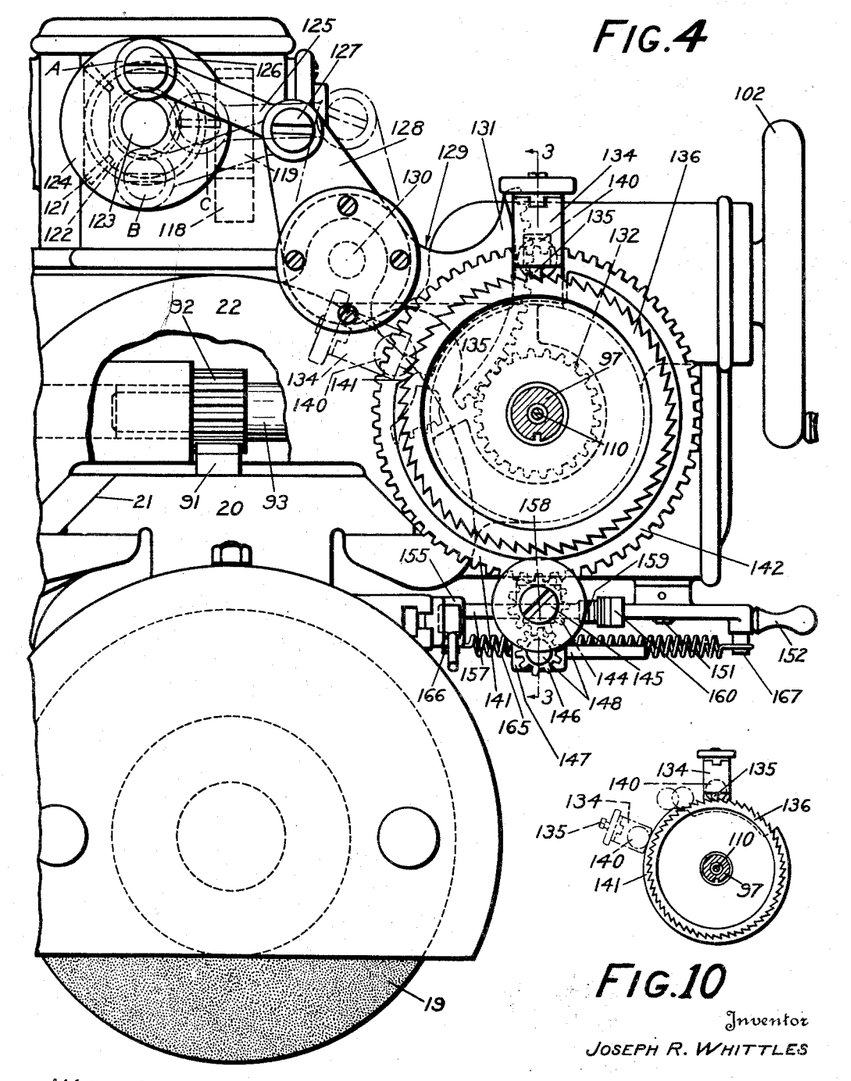
Fig. 4 is a front view on an enlarged scale, partly in section and broken away to clarify the illustration, taken approximately on the line 4—4 of Fig. 3 showing the automatic wheel feeding mechanism.
Fig. 10 is a fragmentary detail view showing the pawl and ratchet mechanism for producing a transverse feed of the grinding wheel.
Figure 5:
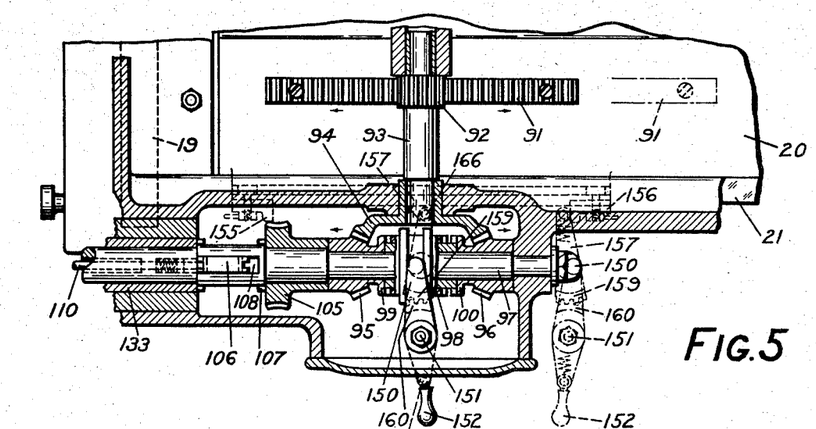
Fig. 5 is a fragmentary sectional view taken approximately on the line 5—5 of Fig. 3 showing the reversing mechanism for the transverse feeding mechanism.

It will be readily appreciated from the foregoing disclosure that each stroke of the piston 111 in either direction moves the crank pin 126 from position A at its uppermost point to position B through an intermediate position C. On one stroke of the piston, the crank pin moves from A through C to B and on the reverse stroke of the piston, moves from B through C to A. In either direction, the movement from A to C or from B to C gives the gear segment 131 a downward movement and moves the pawl 135 in a counterclockwise direction in an idle stroke over the teeth of ratchet 136, and the remaining movement from C to B or from C to A moves the gear segment 131 upward and the pawl 135 in a clockwise or operative position, carrying with it the ratchet wheel 136. The pawl rocks from its full line position (Fig. 4) into the dotted position and returns at each end of the table movement. This movement traverses the grinding wheel at each end of the table stroke.

It is desirable that the amount of traverse feed be adjustable so that the feed of the wheel may be varied as desired. To accomplish this result, the pawl 135 which is spring pressed is provided with a roller 140. A cam 141 is formed integrally with the gear 142 which is in turn freely rotatable on the hub 143. The cam is arranged so that when the angled face of the pawl engages the cam, continued rocking movement of the pawl will raise the pawl out of engagement with the teeth of the ratchet wheel. By adjustment of the position of the cam 141, the amount of transverse feed at each end of the table stroke may be varied. The cam 141 may be adjusted by means of the gear 142 which is normally held against rotation by a pinion 144 rotatably mounted on a stud 145 and held against rotation by a small pinion 146 arranged to be locked to the member 147 by a bolt 148. The position of the cam 141 may be adjusted by loosening the bolt 148 and then rotating the pinion 144 which in turn rotates the gear 142 and cam 141.

The direction of the transverse feeding movement may be reversed either manually or automatically. The clutch member 98 may be actuated by a yoked member 150 which is pivoted on a stud 151. The yoked member 150 may be rocked by a manually operable lever 152 or by adjustable dogs 155 and 156 mounted on the vertical slide 22. The dogs 155 and 156 are arranged in the path of the lever 157 which is pivoted on a stud 158, the other end of the lever being provided with a gear segment 159 meshing with a gear segment 160 on the end of the lever 152. It will be readily appreciated from this construction that as the wheel is fed transversely, the transverse movement will continue intermittently at each end of the table stroke until one of the dogs 155 or 156 contacts with the lever 157 and rocks the lever 152 to shift the clutch member 98 from the clutch teeth 99 into engagement with the clutch teeth 100 or vice versa.

In order that the clutch may be snapped rapidly into reverse position, a suitable load-and-fire mechanism is provided. This may comprise a spring 165 which is connected to a pin 166 on the end of the lever 157 and having its other end connected to a pin 167 adjacent the outer end of the lever 152. When the clutch parts are moved so that the pins 166 and 167 pass the center point of movement, the tension of the spring 165 will snap the levers and clutch rapidly into its reverse position.

Figures 1, 12:
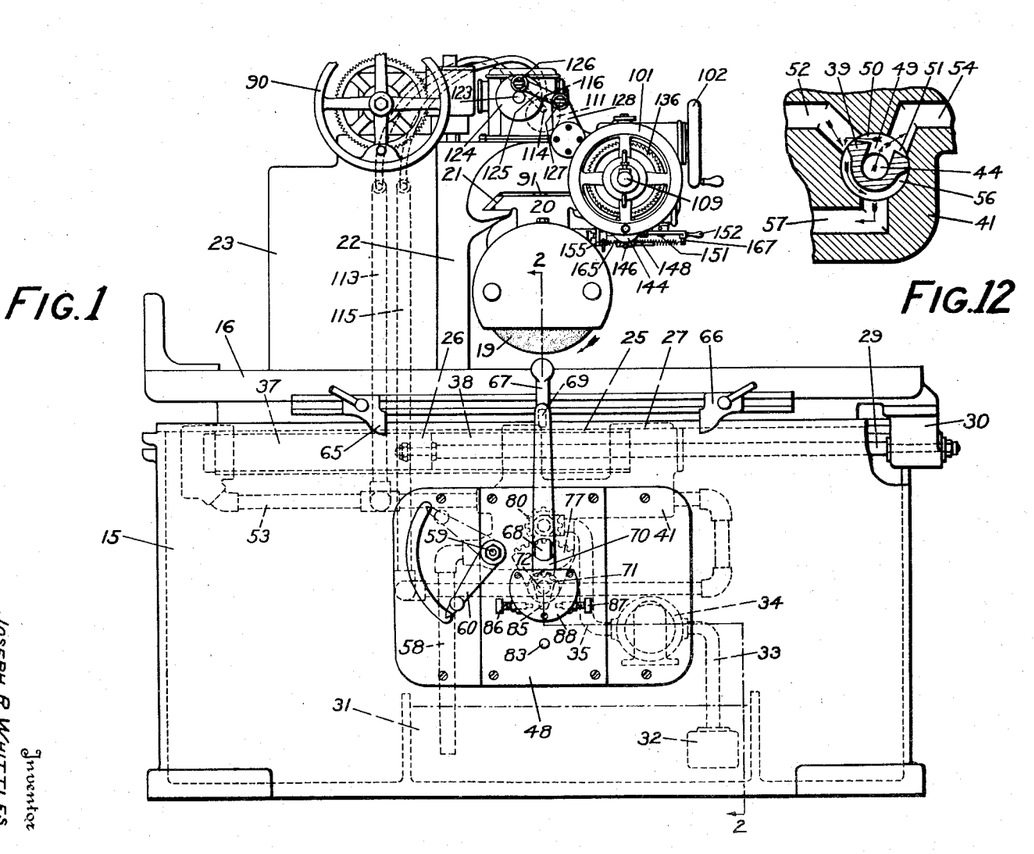
Fig. 1 is a front elevation of the improved surface grinding machine.
Fig. 12 is a fragmentary sectional view of the reversing valve with rotary member in a partial reversed position.

The operation of the machine will be readily apparent from the foregoing disclosure. Assuming the lever 67 to be in a neutral or central position, such as shown in Figs. 1 and 6, the operator throws the lever either towards the right or to the left to start the reciprocation of the work table 16. When lever 67 is in its central or neutral position, fluid is passed through the valve port 49 and V ports 50 and 51 to each end of the cylinder so that the pressure in the cylinder chamber 37 on one side of the piston 26 is balanced by the pressure in the cylinder chamber 38 on the other side of the piston. By utilizing a balanced pressure system, the valve 39 may be moved readily without undue exertion into either of its operating positions. Assuming the operator moves the lever 67 towards the left, into the position as indicated in Fig. 7, this movement of the lever through the connecting parts operates to shift the reversing valve 39 into a position as indicated in Figs. 3 and 7 so that fluid passes through the port 52, pipe 53 into the cylinder chamber 37 to move the table 16 towards the right. At the same time, fluid under pressure is passed through the pipe 113 into the right-hand end of cylinder 111, as viewed in Fig. 3, to actuate the traverse feeding pawl 135. The pawl actuating mechanism, requiring the least amount of power, will be actuated before the piston 26 moves to start the table reciprocation. Movement of the table towards the right, as indicated by the arrow in Fig. 7, will continue until the dog 65 strikes the projection 69 on the lever 67 and throws the lever and reversing valve 39 into the reverse position, as indicated in Fig. 8, so that fluid is passing through the port 49, the V port 51, port 54, through the pipe 115 into the left-hand end of the cylinder 111 to actuate the traverse feed, and at the same time passing fluid under pressure into chamber 38 of cylinder 25 to start the movement of the table 16 towards the left. The length of the table stroke may be readily adjusted by varying the position of the dogs 65 and 66. The amount of transverse feeding movement of the wheel as well as its direction of travel may be readily adjusted. When the wheel has been traversed through the predetermined distance in either direction, the dog 155 or 156 will actuate the clutch 98 and reverse the traverse so that the grinding wheel will be automatically and intermittently reciprocated transversely while the table is being reciprocated longitudinally of the machine base.

Having thus described my invention, what I claim as new and desire to secure by Letters Patent is:

1. A surface grinding machine comprising a base, a work supporting table thereon, a rotatable grinding wheel, a wheel slide to support said wheel for a transverse movement relative to the table, a vertically movable slide to support said wheel slide so that it may be fed toward and from the table, a fluid pressure actuated feeding mechanism on said vertically movable slide to intermittently feed the wheel slide transversely, and a reversing mechanism on said vertically movable slide which is arranged to automatically change the direction of movement of the feeding mechanism and the wheel slide.

2. A surface grinding machine comprising a base, a work supporting table slidable longitudinally thereon, a rotatable grinding wheel having its axis of rotation at right angles to the table movement, a slide supporting the grinding wheel which is movable transversely relative to said table, means to reciprocate said table, fluid pressure actuated means to feed said slide, means including a fluid pressure valve actuated in timed relation with the table reciprocation to intermittently traverse said wheel at each end of the table stroke, and a reversing mechanism to automatically reverse the direction of movement of the wheel slide at a predetermined point and traverse the wheel across the face of the work.

3. A surface grinding machine comprising a base, a work table reciprocable longitudinally thereon, a rotatable grinding wheel, a horizontally movable slide supporting said wheel which is movable transversely relative to the table, a vertically movable slide supporting said wheel slide and movable vertically on the base, means to reciprocate the table, a wheel traversing mechanism to move the wheel slide transversely, a fluid pressure motor on the vertically movable slide, and connections between the motor and the wheel traversing mechanism to actuate the latter.

4. A surface grinding machine comprising a base, a work table reciprocable longitudinally thereon, a rotatable grinding wheel, a horizontally movable slide supporting said wheel which is movable transversely relative to the table, a vertically movable slide supporting said wheel slide and movable vertically on the base, means to reciprocate the table, a wheel traversing mechanism on the vertically movable slide to move the wheel slide transversely, a fluid pressure motor on the vertically movable slide, connections between the motor and the wheel traversing mechanism to actuate the latter, and a valve actuated in timed relation with the table reciprocation to admit fluid under pressure to said motor.

5. A surface grinding machine comprising a base, a work supporting table reciprocable longitudinally thereon, a vertically movable slide on said base, a rotatable grinding wheel, a wheel slide supporting said wheel and movable transversely on said vertically movable slide, and a feeding mechanism for intermittently traversing said wheel slide in both directions through a predetermined distance, which includes a rack on the wheel slide, a pinion on said vertically movable slide and meshing with said rack, a fluid pressure actuated pawl and ratchet mechanism on said vertically movable slide to intermittently actuate said pinion, and a reversing mechanism interposed between said rack and pinion and said pawl and ratchet to automatically reverse the direction of movement at a predetermined point after the wheel has traveled across the face of the work.

6. A wheel head for a surface grinding machine comprising a base, a vertically movable slide supported thereon, a rotatable grinding wheel, a wheel slide supporting said wheel and movable transversely on said vertically movable slide, and a feeding mechanism for said wheel slide including a rack on said wheel slide, a pinion on said vertically movable slide and meshing with said rack, and a fluid pressure actuated pawl and ratchet mechanism on said vertically movable slide to intermittently actuate said pinion and feed the wheel slide.

7. A wheel head for surface grinding machines comprising a rotatable grinding wheel, a wheel slide supporting said wheel, a feeding mechanism for the wheel slide including a rack on said slide, a vertically movable slide supporting said wheel slide, a pinion on said vertically movable slide and meshing with said rack, fluid pressure actuated pawl and ratchet mechanism on said vertically movable slide to intermittently actuate said pinion and feed said wheel slide, a follower roller carried by said pawl and an adjustable cam mechanism engageable with said roller and arranged to positively regulate the number of teeth said pawl picks up at each actuation.

8. A surface grinding machine comprising a base, a work table reciprocable longitudinally thereon, a rotatable grinding wheel, a horizontally movable slide supporting said wheel which is movable transversely relative to the table, a vertically movable slide supporting said wheel slide and movable vertically on the base, a fluid pressure system including a fluid pressure motor to reciprocate said table, and a second fluid pressure motor on the vertically movable slide which is operatively connected to intermittently traverse said wheel at each end of the table stroke.

9. A surface grinding machine comprising a base, a work supporting table slidable longitudinally thereon, a rotatable grinding wheel, a slide supporting the grinding wheel which is movable transversely relative to said table, means including a fluid motor to reciprocate said table, means including a second fluid pressure motor actuated in timed relation with the table reciprocation to intermittently traverse said wheel at the ends of the table stroke, and a reversing mechanism associated with the second motor to automatically reverse the direction of movement of the wheel slide at a predetermined point and traverse the wheel across the face of the work.

10. A surface grinding machine comprising a base, a work supporting table slidable longitudinally thereon, a rotatable grinding wheel, a slide supporting the grinding wheel which is movable transversely relative to said table, means including a fluid pressure piston and cylinder to reciprocate said table, a reversing valve to change the direction of movement of said table, means including a fluid pressure motor to feed said slide, means including a fluid pressure system connected with the table reversing valve to intermittently traverse said wheel at the end of the table stroke, and a reversing mechanism associated with said fluid pressure motor to automatically reverse the direction of movement of the wheel slide at a predetermined point.

JOSEPH R. WHITTLES.